(12) United States Patent
Ferguson

(10) Patent No.: US 8,229,229 B2
(45) Date of Patent: Jul. 24, 2012

(54) SYSTEMS AND METHODS FOR PREDICTING VIDEO LOCATION OF ATTENTION FOCUS PROBABILITY TRAJECTORIES DUE TO DISTRACTIONS

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 1075 days.

(21) Appl. No.: 12/058,517

(22) Filed: Mar. 28, 2008

(65) Prior Publication Data

US 2008/0267442 A1 Oct. 30, 2008

Related U.S. Application Data

(60) Provisional application No. 60/910,818, filed on Apr. 9, 2007.

(51) Int. Cl.
*G06K 9/46* (2006.01)
*G06K 9/40* (2006.01)
(52) U.S. Cl. .................... 382/203; 382/255
(58) Field of Classification Search .............. 382/103, 382/254, 255, 203, 195, 199, 266–269, 205, 382/238, 181; 348/180, 181, 77
See application file for complete search history.

(56) References Cited

U.S. PATENT DOCUMENTS

| 5,748,788 A * | 5/1998 | Moro ................... 382/243 |
| 6,670,963 B2 * | 12/2003 | Osberger ................ 345/629 |
| 6,829,005 B2 * | 12/2004 | Ferguson ................ 348/180 |
| 6,975,776 B2 * | 12/2005 | Ferguson ................ 382/260 |
| 7,102,667 B2 * | 9/2006 | Ferguson ................ 348/180 |
| 2002/0073007 A1 * | 6/2002 | Ayache ................... 705/36 |
| 2003/0174212 A1 * | 9/2003 | Ferguson ................ 348/181 |
| 2004/0243328 A1 * | 12/2004 | Rapp et al. ................ 702/71 |
| 2005/0100235 A1 * | 5/2005 | Kong et al. ............. 382/261 |
| 2005/0111542 A1 * | 5/2005 | Hattori ................. 375/240.01 |
| 2008/0159592 A1 * | 7/2008 | Lin et al. ................ 382/103 |
| 2008/0267442 A1 * | 10/2008 | Ferguson ................ 382/100 |
| 2009/0046893 A1 * | 2/2009 | French et al. .......... 382/103 |
| 2009/0285456 A1 * | 11/2009 | Moon et al. ............ 382/118 |
| 2011/0044498 A1 * | 2/2011 | Cobb et al. ............. 382/103 |
| 2011/0243377 A1 * | 10/2011 | Casamona et al. ...... 382/103 |

* cited by examiner

*Primary Examiner* — Jason M Repko
*Assistant Examiner* — Mia M Thomas
(74) *Attorney, Agent, or Firm* — Matthew D. Rabdau; Michael A. Nelson

(57) ABSTRACT

A method is provided to predict the location of attention focus probability trajectories due to distractions in a test video. A peripheral sensitivity probability map is created base upon a nominal measurement map, and an attention probability map, which are both based on a test video input. A focus of attention probability map with distraction is produced based upon the peripheral sensitivity map, the nominal measurement map, the attention probability map and a distractibility control input.

8 Claims, 9 Drawing Sheets

SYSTEMS AND METHODS FOR PREDICTING VIDEO LOCATION OF ATTENTION FOCUS PROBABILITY TRAJECTORIES DUE TO DISTRACTIONS

CROSS-REFERENCE TO RELATED APPLICATIONS

This application claims the benefit of U.S. Provisional Application No. 60/910,818 filed on Apr. 9, 2007, entitled Systems and Methods for Predicting Video Location of Attention Focus Probability Trajectories Due to Distractions, which application is hereby incorporated herein by reference.

BACKGROUND

Embodiments of the present invention relate to video test and measurement and more particularly to an improvement to core video picture quality (PQ) measurements, such as subjective video quality predictions for causal viewers.

Video compression methods such as MPEG-2 and H.264 process video use lossy compression methods and introduce errors, ideally unseen by the human eye. Any visible error caused by loss in the compression method manifests itself as an impairment artifact which generally can be distracting to the viewer. In addition, other aspects of the video image draw the viewers attention. Algorithms used to predict the probability density of focus of attention over space and time due to these other non-distraction attention attracters have been developed and are often referred to as "attention models." The term "distraction" here refers to video impairments and more general deviations from a video reference rather than intended content in the video, which may have its own types of "distractions."

Attention models developed thus far, when used in conjunction with other video measurements such as perceptual difference prediction models, etc., when measuring video with distractions, generally don't improve predictions of subjective ratings any more than if the attention model were removed. However, much research has shown that when distractions are not present, prediction of the probability of focus of attention can be quite good. Also, it is known that, depending on how much the video display occupies the field of view, human peripheral vision is substantially less sensitive to spatial distortions than "foveal" or center of vision. Thus, a key missing piece for the prediction of how visible video degradation will be depends on where people look, including when they look at aforementioned distractions.

SUMMARY

What is needed is an automated method to predict viewer focus of attention as in prior art, but with the new addition of attention due to distraction. This method should include means of being incorporated into existing video measurements, especially picture quality measurements and subjective quality ratings predictions, such as a means of weighting these measurements. Also, a control of distractibility is important for particular applications reflecting demographics, etc. Finally, it is desirable that this method which includes attention behavior in response to distraction have computational efficiency, such that there is a relatively low level of processing for the given accuracy.

Accordingly, various embodiments of the present invention provide for the inclusion of mechanisms that produce representations of distractions in an attention model for video quality assessment; the inclusion of mechanisms to simulate reduced perceptual sensitivity (both threshold and suprathreshold) in peripheral vision (except for cases, such as motion of objects above a certain size, etc.), thereby better predicting the ability of a potential distraction to be seen; and the inclusion of mechanisms for recognition of likely classes of video artifacts that may be seen as distractions and allow selective weighting of each artifact class in the prediction of probability of distraction of attention. Further embodiments include objective analogs corresponding to the mechanisms described.

DETAILED DESCRIPTION

Figure 1:
FIG. 1 is an example of an unimpaired reference video frame of a reference video sequence used for Full Reference measurements.
Figure 2:
FIG. 2 is an example of an impaired test video frame of a test video sequence used with either Full Reference or No Reference measurement.
Figure 3:
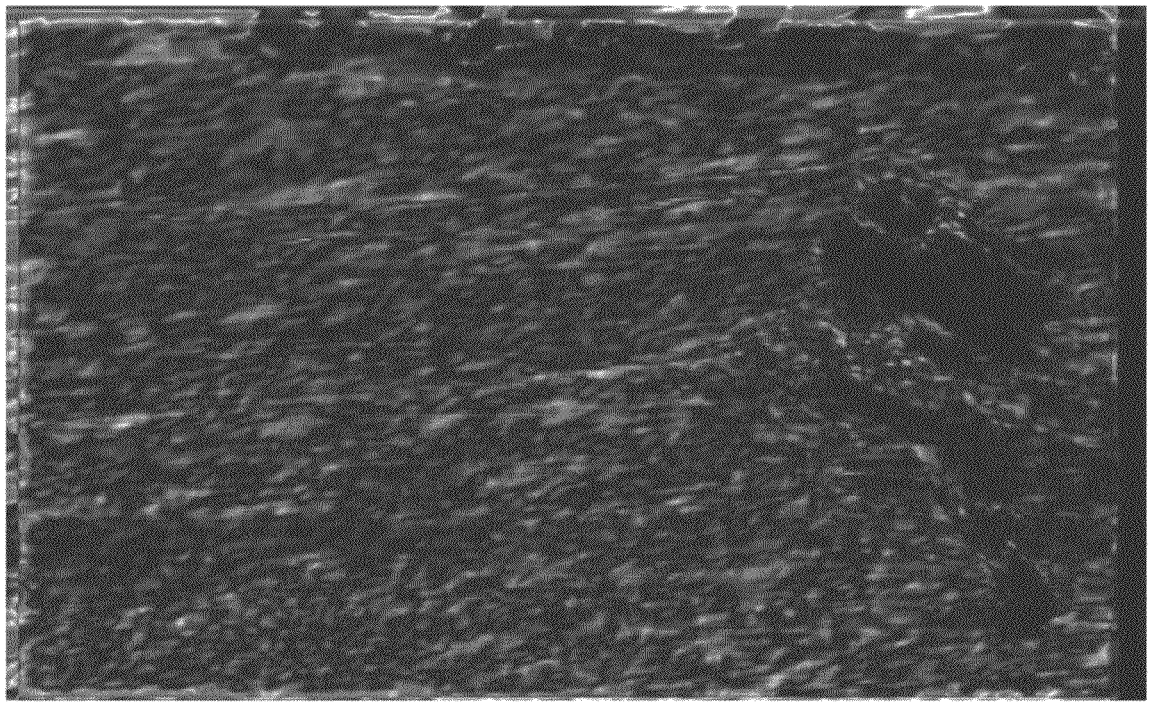
FIG. 3 is an example of a predicted perceptual contrast difference map computed for the reference video frame of FIG. 1 and the test video frame of FIG. 2.
Figure 4:
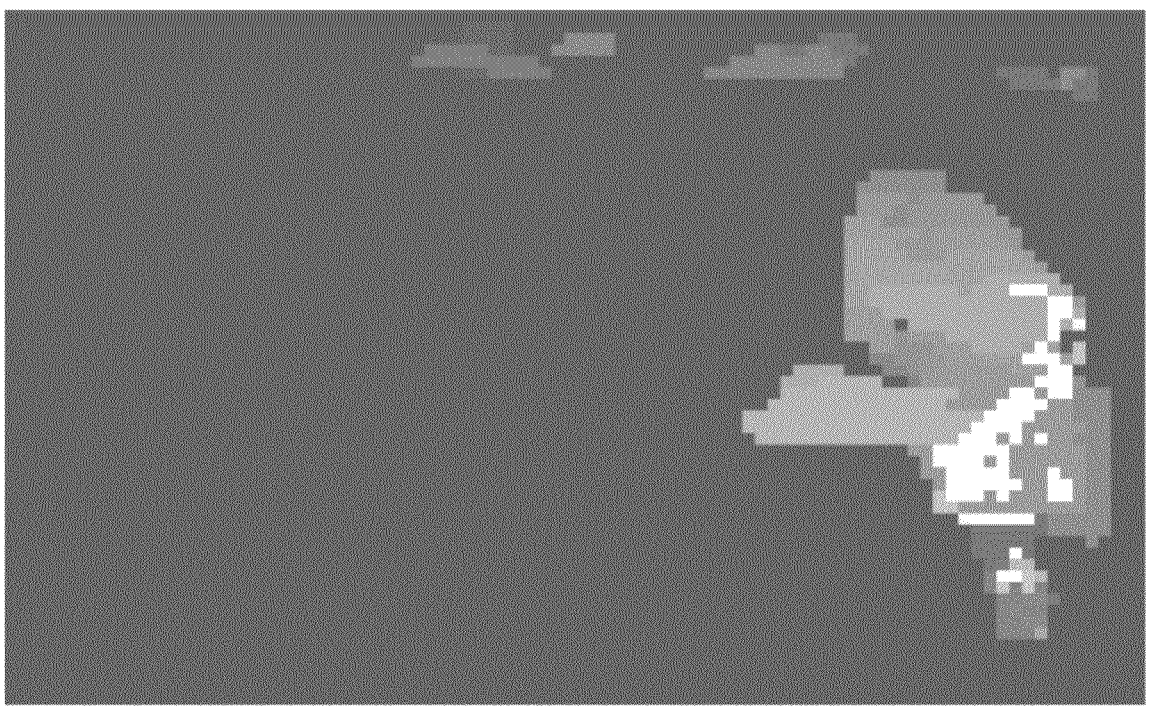
FIG. 4 is an example of a predicted focus of attention probability map computed for the video shown in FIG. 1
Figure 5:
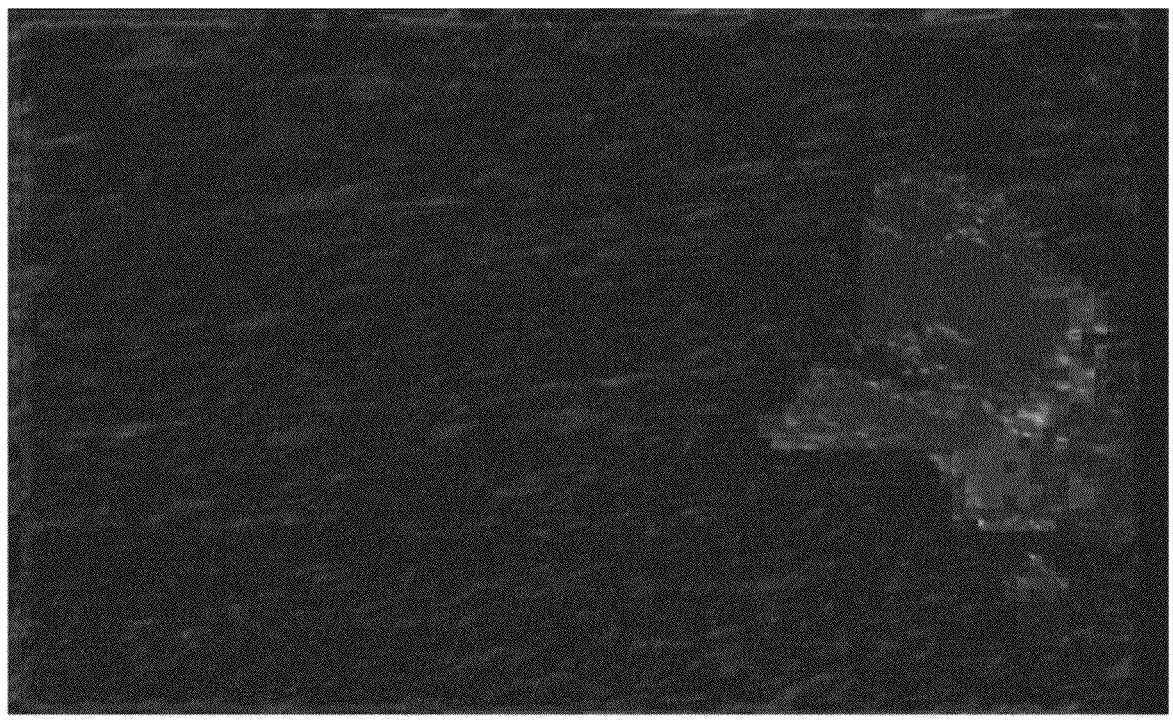
FIG. 5 is an example of an attention weighted predicted perceptual contrast difference map computed for the video shown in FIG. 1 using the attention map of FIG. 3 and perceptual difference map of FIG. 4.
Figure 6:
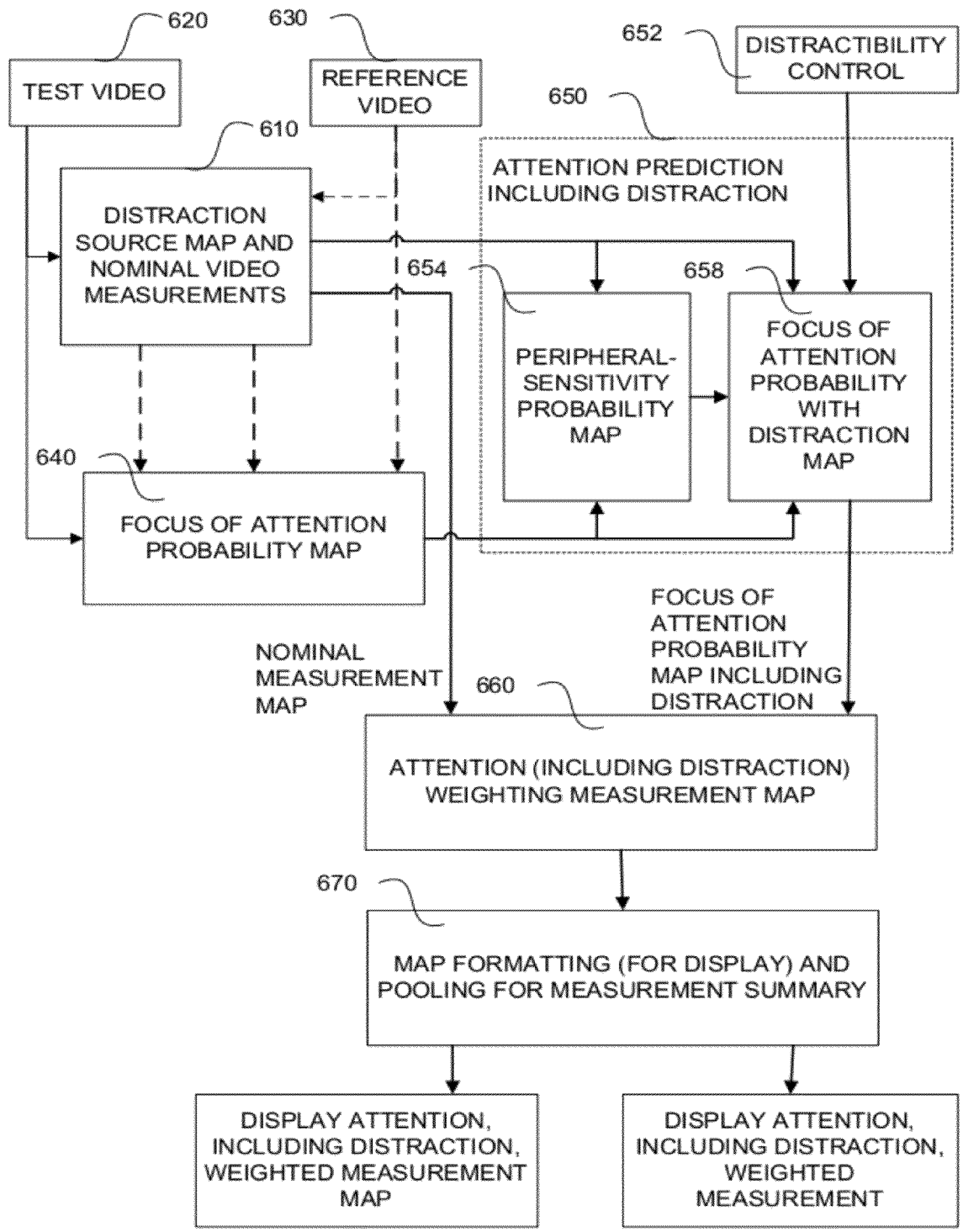
FIG. 6 is a block diagram illustrating embodiments of the present invention.

Embodiments of the present invention are shown in FIG. 6. Nominal video measurements and a distraction source map are made as shown at 610 based upon a test video input 620, and optionally a reference video input 630 corresponding to the test video 620, but without impairments present in the test video input. An example of a test video frame is shown in FIG. 2 along with the corresponding reference video frame shown in FIG. 1. In an embodiment of the present invention, the nominal video measurements and distraction source map are made as full reference measurements using the reference video input 630 along with the test video input 620. In an alternative embodiment, the nominal video measurements and distraction source map are made as no reference measurements, meaning without the use of the reference video input 630. Whether using full reference, or no reference, embodiments of the present invention can be either subjective, objective, or objectively weighted subjective measurements. In an embodiment applying a subjective measurement, means and methodologies described in U.S. Pat. No. 6,975,776 entitled "Predicting Human Vision Perception and Perceptual Difference", by Kevin Ferguson, issued Dec. 13, 2005, which is hereby incorporated herein by reference, are employed. In an embodiment applying objective measurements a PSNR measurement is performed. In another embodiment applying objective measurements, artifact detection is performed as described in U.S. patent application Ser. No. 12/058,474 entitled "Systems and Methods for Measuring Loss of Detail in a Video Codec Block" by Kevin Ferguson et al. filed Mar. 28, 2008, which is hereby incorporated herein by reference. In a further embodiment, an objectively weighted subjective measurement is provided as described in U.S. Pat. No. 7,102,667 entitled "Picture Quality Diagnostics for Revealing Cause of Perceptible Impairments," by Kevin Ferguson, issued Sep. 5, 2006, which is hereby incorporated herein by reference. An example of a nominal video measurement map, which is unweighted by attention, referred to herein as a "nominal map" is shown in FIG. 3. FIG. 4 shows an example of a focus of attention probability map, referred to herein as an "attention map." These are provided as examples of outputs provided by nominal video measurements as shown at 610.

The test video input 620 is also used to create a focus of attention probability map 640. In the case of a no reference measurement, the test video is input by itself. In a full reference embodiment, the reference video input 630 is also provided. Note that the dashed arrows between the Nominal Video Measurement block and the Attention Model indicate an optional embodiment including intermediate perceptual model outputs (perceptual contrast) used as inputs to the attention model instead of the direct video inputs. In an embodiment of the invention, a focus of attention probability map is provided as described in U.S. Pat. No. 6,670,963 entitled "Visual Attention Model," by Wilfried Osberger, issued Dec. 30, 2003, which is hereby incorporated herein by reference.

Figure 7:
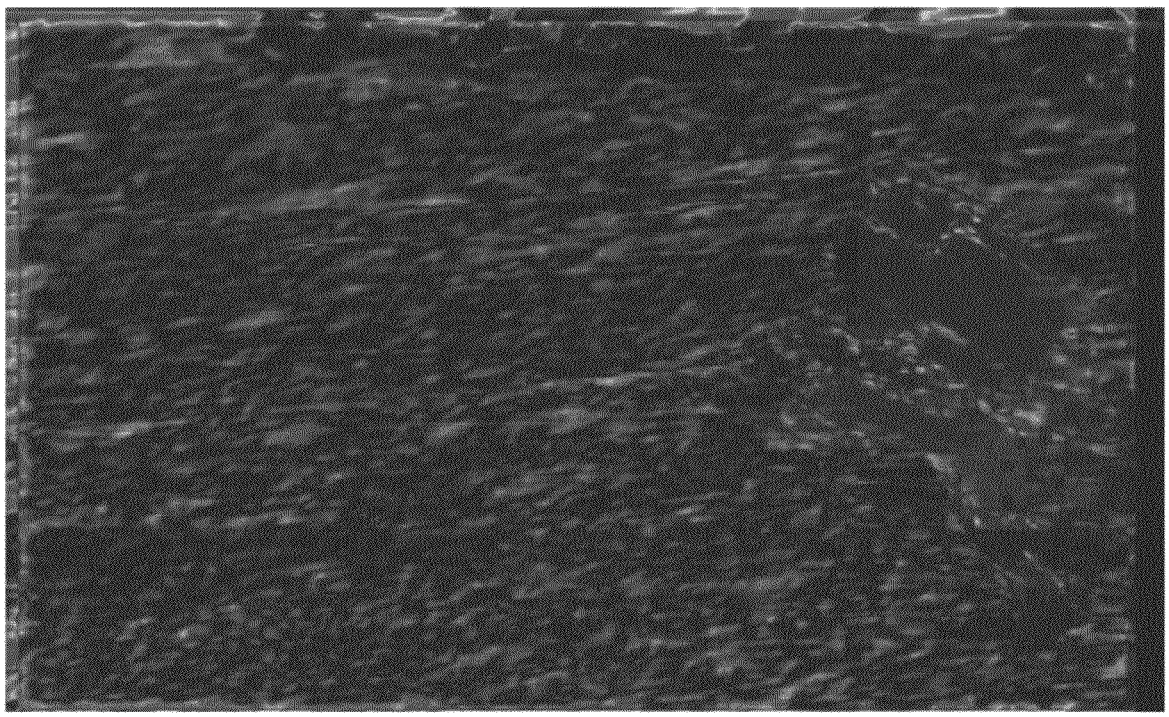
FIG. 7 is an example of a focus of attention probability map with distraction included with distractibility control set to 100%.
Figure 8:
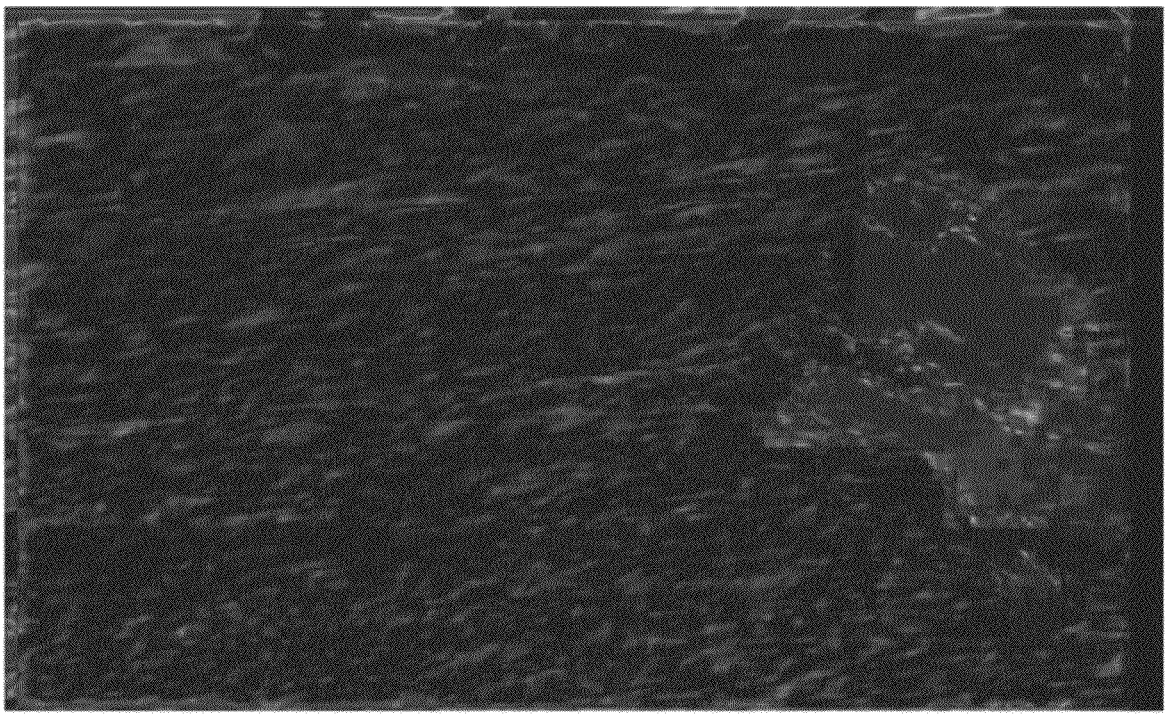
FIG. 8 is an example of a focus of attention probability map with distraction included with distractibility control set to 50%.
Figure 9:
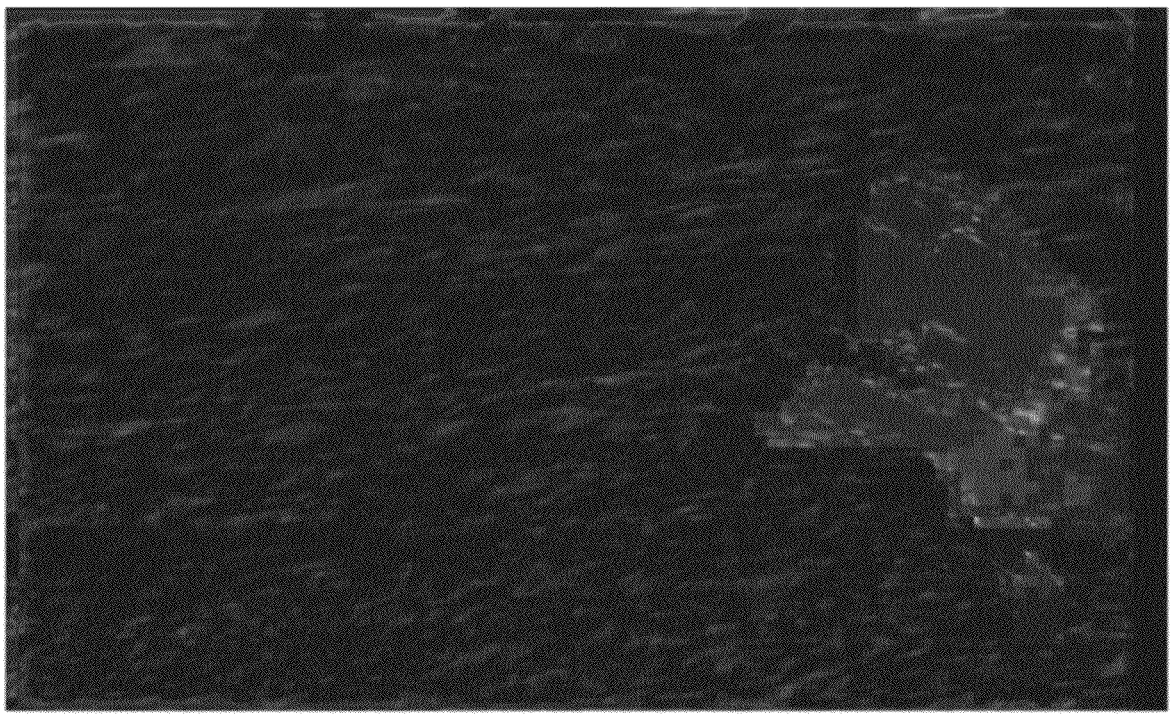
FIG. 9 is an example of a focus of attention probability map with distraction included with distractibility control set to 10%.

The outputs of the distraction source map and the nominal video measurements 610 and the focus of attention probability map 640 are provided to that attention prediction including distraction 650 along with a distractibility control 652. The distractibility control provides for example a value of between 0 and 100%. The output of the attention prediction including distraction 650 is provided as an input to the attention including distraction weighting measurement map 660, along with the nominal map. The map 660 masks the nominal map with the input map from the attention prediction with distraction 650. This produces results as shown for example in FIGS. 7-9 corresponding to distractibility control settings of 100%, 50% and 10%, respectively.

The output of the attention, including distraction, weighting measurement map is provided to a map formatting and pooling block 670, which provides measurement maps as well as measurement summary data for display to an end user.

The resulting output from block 670 is a display of attention, including distraction, weighted measurement map. An attention, including distraction, weighted measurement may also be displayed in some embodiments.

The attention prediction including distraction block 650 provides two other blocks for performing certain operations. A peripheral sensitivity probability map 654 is created based upon the nominal map and the attention probability map. A second block 658 creates a focus of attention probability with distraction map based upon the nominal map, the attention probability map, the peripheral sensitivity map, and the input from the distractibility control. The operation of these two blocks within the attention probability including distraction block will be described in more detail below.

Figure 10:
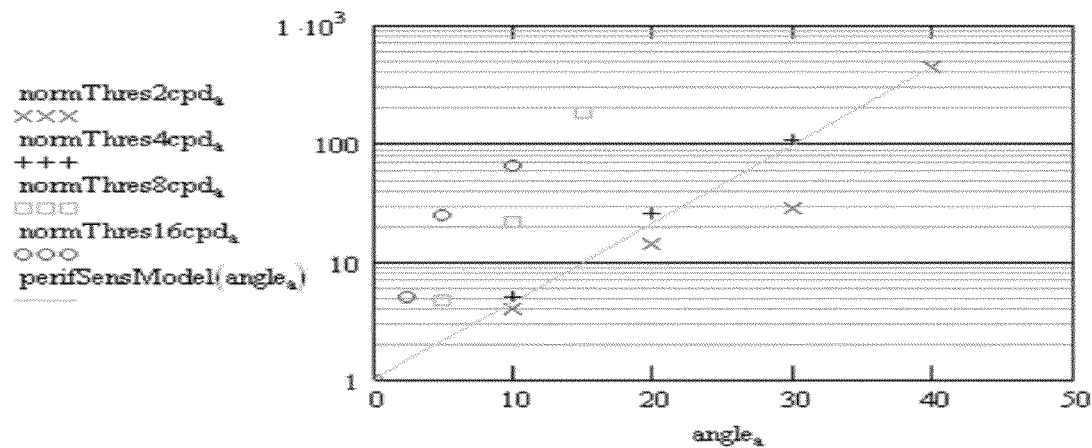
FIG. 10 is a graph of peripheral threshold evaluation with respect to eccentricity data vs. a simple model perifSensModel(angle).

In an embodiment of the present invention, the peripheral sensitivity probability map is created by convolving the sensitivity vs. eccentricity map with the attention probability map. Peripheral sensitivity change with eccentricity has been explored in vision science with experimental data results such as in the work of Mark Cannon. Contrast sensitivity threshold elevation may be approximated for a given frequency (in this case approximately corresponding to greatest sensitivity) by $$\text{perifSensRawModel}(\text{Eccentricity}) = 1.165^{Eccentricity}$$

as shown in FIG. 10.

In polar coordinates, the human vision point spread function (PSF) representing this sensitivity across two dimensions may be approximated as a circular sweep of perifSensModel( ) with r substituted for eccentricity:

$$\text{perifSensModelPSFpolar}(\Theta, r) = \text{perifSensModel}(-r)$$

Note that −r is used instead of r because the point spread function is the reciprocal of the sensitivity elevation.

And finally, in rectangular coordinates:

$$\text{perifSensModelPSF}(x,y) = \text{perifSensModel}(-\sqrt{x^2+y^2})$$

This point spread function is convolved with the attention map to produce a PSFF map that represents the reciprocal of the probability of the threshold elevation due to peripheral vision when looking at the attention attracters in an image according to the attention map probabilities. Each sample of the PSFF map is then divided into the nominal (foveal) threshold of 0.1% perceptual contrast (per Canon) to produce the elevated threshold.

This method achieves a high level of accuracy. However, it is somewhat computationally expensive. Examining how much the point spread function changes in a particular viewing distance (field of view occupied by the image) leads to a good approximation with a much simpler alternative method: Use the mean peripheral sensitivity elevation according to mean image eccentricity. For example, consider the maximum eccentricity range as a function of viewing distance (in units of screen heights):

$$\text{MaxEccentricity}(viewingDist, aspectRatio) = \tan^{-1}\left(\frac{1}{2*viewingDist*aspectRatio}\right)*\frac{180}{\pi}$$

Figure 11:
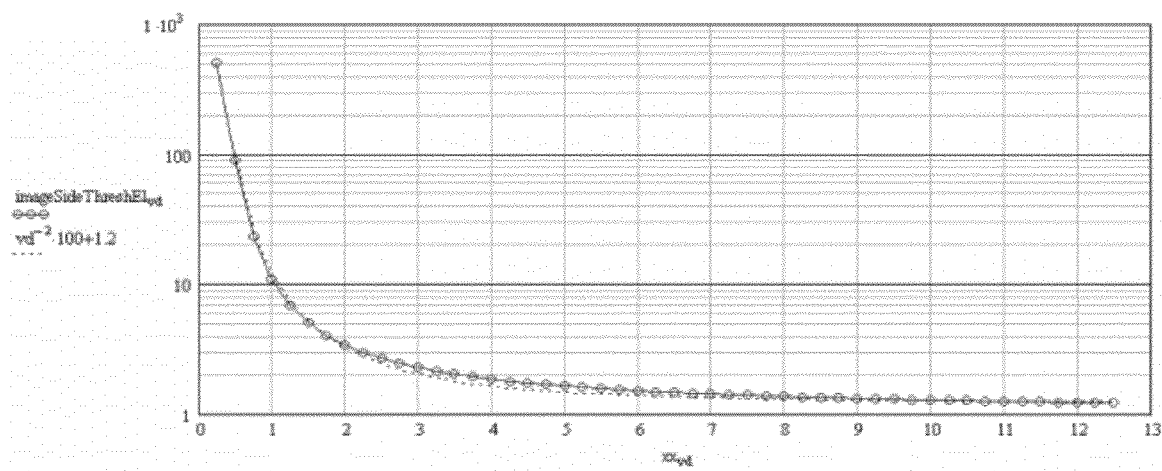
FIG. 11 is graph of maximum threshold evaluation factor in an image as a function of viewing distance for an example display aspect ratio of 16:9.
Figure 12:
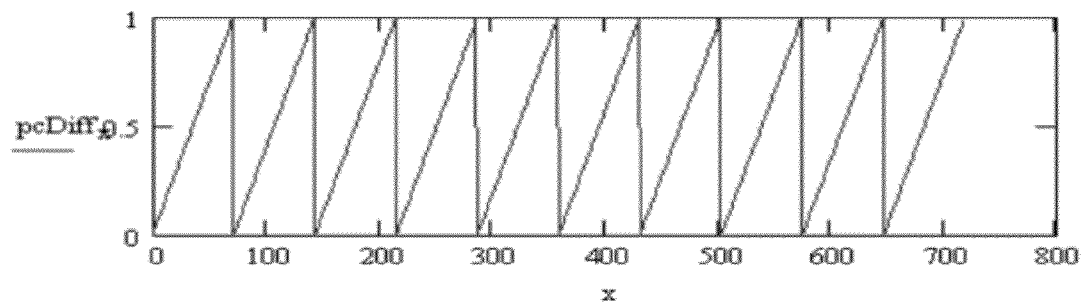
FIG. 12 shows a synthetic nominal map line used for illustrating the behavior an embodiment of the present invention.
Figure 13:
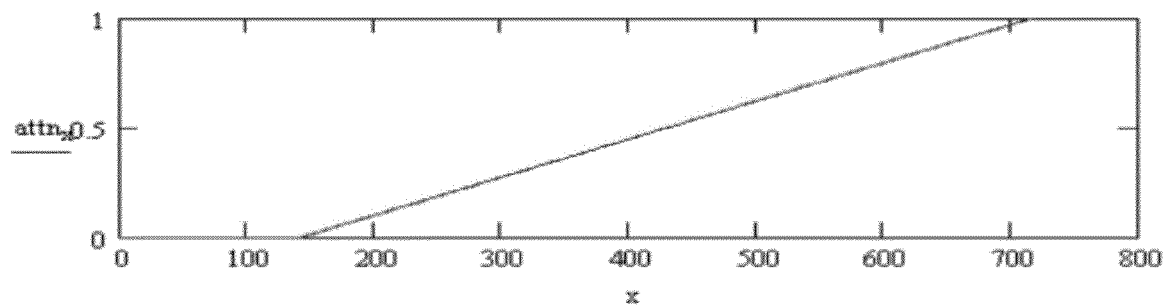
FIG. 13 shows a synthetic attention map line used for illustrating the behavior an embodiment of the present invention.
Figure 14:
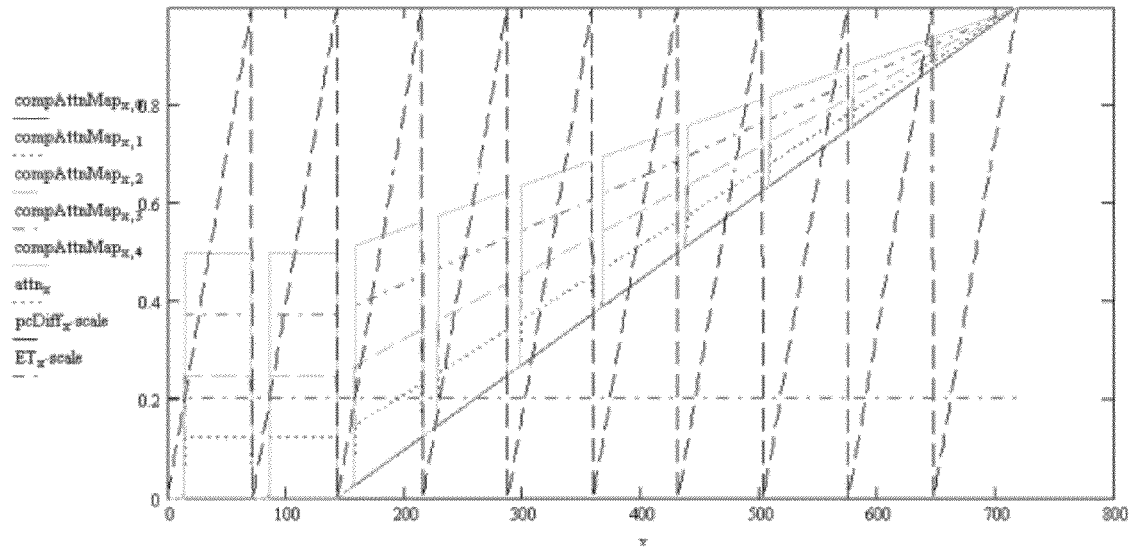
FIG. 14 shows the inputs of FIGS. 12 and 13 scaled and superimposed on an elevated threshold (ET) map and composite attention maps with distraction set at distraction controls of 0%, 25%, 50%, 75% and 100% respectively.
Figure 15:
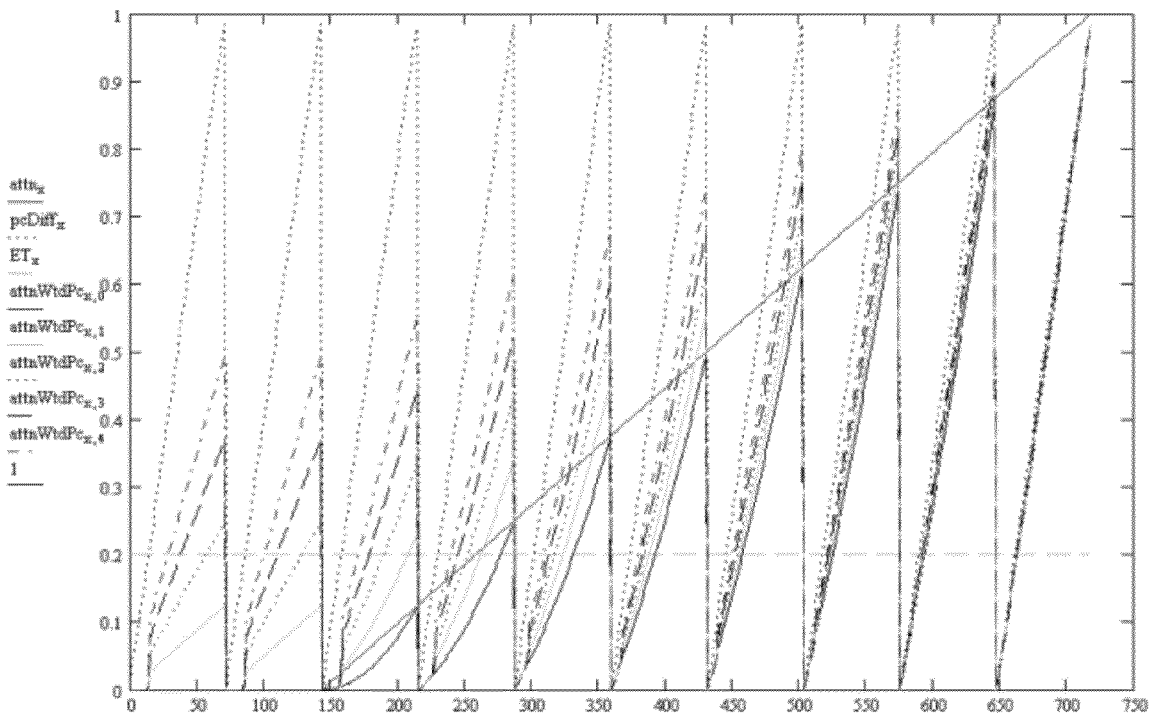
FIG. 15 shows the resulting attention, including distraction, weighted measurements superimposed on ET map corresponding to composite attention maps with distraction set at distraction controls of 0%, 25%, 50%, 75% and 100% respectively.

For an aspect ratio (aspectRatio) of a high definition television display, 16/9, this function is plotted vs viewing distance (viewingDist) in FIG. 11. This plot illustrates that the dynamic range of the PSF is quite low in many practical video viewing cases, so if a constant elevation corresponding to the mean eccentricity were to be used, an approximately minimum overall (RMS, etc.) error will result. The mean eccentricity of an image given maximum eccentricity and display aspect ratio is given by:

$$MeanEccentricity = \frac{\sum_x \sum_y \sqrt{\left(x - \frac{totalViewingAngle}{2}\right)^2 + \left(y - \frac{totalViewingAngle}{2*aspectRatio}\right)^2}}{totalViewingAngle^2 * aspectRatio^{-1}}$$

where totalViewingAngle=2*MaxEccentricity(viewingDist, aspectRatio)

The approximate mean contrast sensitivity threshold elevation may be calculated from calculating perifSensModelPSFpolar(0,MeanEccentricity) given viewing distance and display aspect ratio. Generally, attention maps include higher probabilities distributed towards the middle of the screen, so on average, there is not a large variance in elevated thresholds across the image. Values of elevation factor range from near 2 for 3 screen heights down to approximately 1.25 for 10 screen heights. These values may be used as the entire peripheral sensitivity map output from block 654 of FIG. 6.

This method yields speed (low computational expense) with good approximation for most applications.

Similarly, the suprathreshold response changes with peripheral vision, but even less so. So for cases were threshold elevation may be represented as a constant, the suprathreshold sensitivity may also be represented with a constant.

A method is provided for creating a focus of attention probability with distraction map as provided at 658, in FIG. 6. Areas of normally low attention are elevated with sufficient distraction. This method yields speed (low computational expense) with good approximation for most applications. The peripheral sensitivity (elevated threshold or ET) probability map (optionally substituted with a constant value as mentioned above) is combined with the attention map and the nominal map and distractibility control using the following pixel-wise operation:

$$attentionProb(pcDiff, attn, ET, EG, maxAttn, wt) =$$
$$if\left(pcDiff > ET\frac{maxAttn - attn}{maxAttn}, EG, 0\right)(maxAttn - attn)*wt + attn$$

where
pcDiff represents the pixel at row y and column x of the nominal map
attn is the corresponding pixel of the attention map
ET is the pixel of the peripheral sensitivity (elevated threshold or ET) probability map
EG is the suprathreshold sensitivity probability map
maxAttn is the maximum value in the attention map
wt is the distractibility control if(boolean, x, y)=x if boolean is true, y if false Note that maxAttn was normalized to 1 for convenience in this example, while in the general case the value depends on the probability distribution.

FIGS. 12-15 illustrate the behavior of attentionProb with various levels of nominal map, attention map and distractibility control.

In effect, a region of image with low probability of attention will likewise have an elevated threshold for the nominal map (for example perceptual contrast) and low values are entirely masked. On the other hand, regions with high attention probability are not affected by the distraction in that the attention probability remains unchanged and the final attention weighted output is likewise unchanged. In between these two extremes in attention map values, there is a continuum of responses, all appropriately weighted by the distractibility control.

What is claimed is:

1. A method of predicting video location of attention focus probability trajectories due to distractions comprising:
    creating a nominal measurement map based upon a test video input;
    creating an attention probability map based upon a test video input;
    creating a peripheral sensitivity probability map based upon the nominal measurement map and the attention probability map;
    creating a focus of attention probability map with distraction based upon the nominal measurement map, the attention probability map, the peripheral sensitivity map and a distractibility control; and
    providing an attention weighting measurement map based upon the focus of attention probability map with distraction and the nominal measurement map.

2. The method of claim 1, further comprising formatting the attention weighting measurement map and displaying the attention weighting measurement map.

3. The method of claim 1, further comprising, pooling attention weighting measurements and displaying an attention weighting measurement, including distraction.

4. The method of claim 1, wherein creating the nominal measurement map is based upon the test video input and a reference video input.

5. The method of claim 1, wherein creating the attention probability map is based upon the test video input and a reference video input.

6. The method of claim 1, wherein creating the peripheral sensitivity probability map comprises convolving a sensitivity map versus eccentricity map based upon the nominal measurement map with the attention probability map.

7. The method of claim 1, wherein the creating the focus of attention probability with distraction map elevates areas of low attention based upon a level of distraction.

8. The method of claim 1, wherein providing the attention weighting measurement map uses the attention related map as a mask of the nominal measurement map.

* * * * *